United States Patent
Crabtree et al.

(10) Patent No.: US 12,462,016 B2
(45) Date of Patent: *Nov. 4, 2025

(54) SYSTEM AND METHODS FOR SANDBOXED SOFTWARE ANALYSIS WITH AUTOMATED VULNERABILITY DETECTION AND PATCH DEVELOPMENT, DEPLOYMENT AND VALIDATION

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 274 days.

This patent is subject to a terminal disclaimer.

(21) Appl. No.: 18/299,470

(22) Filed: Apr. 12, 2023

(65) Prior Publication Data
US 2024/0119140 A1    Apr. 11, 2024

Related U.S. Application Data

(63) Continuation-in-part of application No. 18/161,862, filed on Jan. 30, 2023, now abandoned, which is a
(Continued)

(51) Int. Cl.
*G06F 21/53* (2013.01)
*G06F 8/65* (2018.01)
(Continued)

(52) U.S. Cl.
CPC .............. *G06F 21/53* (2013.01); *G06F 8/65* (2013.01); *G06F 9/455* (2013.01); *G06F 21/566* (2013.01);
(Continued)

(58) Field of Classification Search
CPC . G06F 21/53; G06F 8/65; G06F 9/455; G06F 21/566; G06F 21/577;
(Continued)

(56) References Cited

U.S. PATENT DOCUMENTS

| 6,256,544 | B1 | 7/2001 | Weissinger |
| 7,739,653 | B2 | 6/2010 | Venolia |

(Continued)

FOREIGN PATENT DOCUMENTS

| WO | 2014159150 A1 | 10/2014 |
| WO | 2017075543 A1 | 5/2017 |

*Primary Examiner* — Cheng-Feng Huang
(74) *Attorney, Agent, or Firm* — Galvin Patent Law LLC; Brian R Galvin

(57) ABSTRACT

A system and method for automated software vulnerability detection and patching using sandboxed analysis. The system receives executable machine code files and identifies target device types for execution. A sandbox environment emulates device functionality and executes code while monitoring for suspicious behavior including memory scanning, unauthorized system access, and irregular network activity. Machine learning algorithms analyze execution patterns to detect security vulnerabilities and exploits. Upon identifying threats, the system automatically generates protective patches such as address space layout randomization and data execution prevention measures. These patches are deployed to real devices to prevent exploitation. The system uses reinforcement learning to improve patch effectiveness over time. This automated approach enables proactive cybersecurity protection by responding to emerging threats before malicious exploitation occurs.

4 Claims, 16 Drawing Sheets

Related U.S. Application Data continuation-in-part of application No. 17/028,979, filed on Sep. 22, 2020, now Pat. No. 11,568,042, which is a continuation of application No. 15/887,496, filed on Feb. 2, 2018, now Pat. No. 10,783,241, which is a continuation-in-part of application No. 15/823,285, filed on Nov. 27, 2017, now Pat. No. 10,740,096, and a continuation-in-part of application No. 15/818,733, filed on Nov. 20, 2017, now Pat. No. 10,673,887, said application No. 15/823,285 is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, said application No. 15/818,733 is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, said application No. 15/787,601 is a continuation-in-part of application No. 15/616,427, filed on Jun. 7, 2017, now abandoned, said application No. 15/655,113 is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/616,427 is a continuation-in-part of application No. 14/925,974, filed on Oct. 28, 2015, now abandoned.

(60) Provisional application No. 62/568,307, filed on Oct. 4, 2017, provisional application No. 62/568,312, filed on Oct. 4, 2017, provisional application No. 62/568,305, filed on Oct. 4, 2017.

(51) Int. Cl.
| | | |
|---|---|---|
| *G06F 9/455* | (2018.01) | |
| *G06F 21/56* | (2013.01) | |
| *G06F 21/57* | (2013.01) | |
| *G06Q 40/08* | (2012.01) | |
| *H04L 9/40* | (2022.01) | |
| *G06F 11/30* | (2006.01) | |
| *G06N 20/00* | (2019.01) | |
| *G06Q 50/00* | (2012.01) | |

(52) U.S. Cl.
CPC .......... *G06F 21/577* (2013.01); *G06Q 40/08* (2013.01); *H04L 63/1425* (2013.01); *H04L 63/1433* (2013.01); *G06F 11/3058* (2013.01); *G06F 2221/033* (2013.01); *G06F 2221/2149* (2013.01); *G06N 20/00* (2019.01); *G06Q 50/01* (2013.01)

(58) Field of Classification Search
CPC .......... G06F 11/3058; G06F 2221/033; G06F 2221/2149; G06Q 40/08; G06Q 50/01; H04L 63/1425; H04L 63/1433; G06N 20/00
See application file for complete search history.

(56) References Cited

U.S. PATENT DOCUMENTS

| | | |
|---|---|---|
| 8,805,947 B1 | 8/2014 | Kuzkin et al. |
| 9,141,360 B1 | 9/2015 | Chen et al. |
| 9,189,375 B1 | 11/2015 | Bastien et al. |
| 9,245,114 B2 | 1/2016 | Thomas et al. |
| 9,594,912 B1 | 3/2017 | Thioux et al. |
| 9,602,530 B2 | 3/2017 | Ellis et al. |
| 9,672,355 B2 | 6/2017 | Titonis et al. |
| 9,680,824 B1 | 6/2017 | Rodgers et al. |
| 10,031,832 B1 | 7/2018 | Bastien et al. |
| 10,061,635 B2 | 8/2018 | Ellwein |
| 10,079,841 B2 | 9/2018 | Gupta et al. |
| 10,210,329 B1 | 2/2019 | Malik et al. |
| 10,248,910 B2 | 4/2019 | Crabtree et al. |
| 10,367,829 B2 | 7/2019 | Huang et al. |
| 2005/0289072 A1 | 12/2005 | Sabharwal |
| 2010/0125900 A1 | 5/2010 | Dennerline et al. |
| 2011/0258610 A1 | 10/2011 | Aaraj et al. |
| 2012/0079596 A1 | 3/2012 | Thomas et al. |
| 2013/0097706 A1 | 4/2013 | Titonis et al. |
| 2016/0004858 A1* | 1/2016 | Chen ................ G06F 21/10 726/17 |
| 2016/0021142 A1* | 1/2016 | Gafni ............... G06F 9/45558 726/23 |
| 2016/0099960 A1 | 4/2016 | Gerritz et al. |
| 2016/0275123 A1 | 9/2016 | Lin et al. |
| 2016/0330215 A1 | 11/2016 | Gafni et al. |

\* cited by examiner

SYSTEM AND METHODS FOR SANDBOXED SOFTWARE ANALYSIS WITH AUTOMATED VULNERABILITY DETECTION AND PATCH DEVELOPMENT, DEPLOYMENT AND VALIDATION

CROSS-REFERENCE TO RELATED APPLICATIONS

Priority is claimed in the application data sheet to the following patents or patent applications, each of which is expressly incorporated herein by reference in its entirety:
Ser. No. 18/161,862
Ser. No. 17/028,979
Ser. No. 15/887,496
Ser. No. 15/823,285
Ser. No. 15/788,718
Ser. No. 15/788,002
Ser. No. 15/787,601
Ser. No. 15/616,427
Ser. No. 14/925,974
Ser. No. 15/818,733
Ser. No. 15/725,274
Ser. No. 15/655,113
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
62/568,312
62/568,305
62/568,307

BACKGROUND OF THE INVENTION

Field of the Art

The disclosure relates to the field of computer management, and more particularly to the field of cybersecurity and threat analytics.

Discussion of the State of the Art

On Aug. 4, 2016, United States government's DEFENSE ADVANCED RESEARCH PROJECTS AGENCY (DARPA)™ hosted an event in 2016 called the Cyber Grand Challenge, aimed at creating an automatic defense system for network defense and vulnerability detection and patching. During the event numerous teams and individuals competed to develop a system which could automatically detect vulnerabilities and exploits in software systems, develop a patch, and deploy the patch within a finite amount of time, in an effort to produce a highly robust system to defend software systems from a variety of possible exploits and malicious attacks. The competition was partially successful, with the submitted systems from each team competing automatically in a capture-the-flag style competition, and the competition in its entirety demonstrated that fully autonomous network defense and exploitation is possible. No team's submission completed the competition with 100% success in identifying either vulnerabilities and exploits, and as of yet no such system is deployed for large scale or commercial applications in automated analysis and defense of networks and network-connected devices. In parallel to this effort, ongoing research into Binary Executable Transforms and vectorized representations of binary programs that learn a high dimensional representation of binary executable programs is growing robustly. Work is ongoing with respect to both functional algorithm classification and understanding as well as vulnerability discovery in parallel to formal methods-based approaches to vulnerability reduction via explicit understanding of computable execution paths. Malware of today is continually being advanced in the area of memory utilization and scanning, to evade detection from current anti-virus, endpoint detection and response and antimalware software, and continually advancing and evolving network and system defense techniques are required in order to keep up with the pace of advancement of malware and post-exploitation attack techniques both today and in the future. Even until this competition, no system existed even for research applications which could reliably identify and rapidly patch vulnerabilities and exploits in software systems and networks before malware took advantage of said vulnerabilities in the software. It is commonly the case that vulnerabilities and exploits in software are only found out and then patched some time after they are taken advantage of, falling out of view of the system developers before the issue is made use of by malicious actors, for example the Heartbleed exploit present in many OpenSSL systems until patched in 2014, only shortly after the vulnerability was publicly disclosed.

The invention detailed herein leverages available source code, if available, alongside compilation (translation process of going from source code to binary executable programs) to determine actual program instructions which are valid and those that are intended. Since compilation is a lossy process in that only basic low-level instructions and data representations understood by the target CPU are preserved, it is important to enrich compiled versions of software with source and additional data if available. In the general case, compiled versions of software on the target system will not have sufficient information to reliably reconstruct the original source code especially when stripped by threat actors or commercial entities who internally remove any debug information and symbol tables, which might contain semantics of variables. Since the scope of binary code analysis is becoming increasingly large, the ability to conduct fast and automated analysis would allow for the preventing of active exploitation of unintended bugs and vulnerabilities in numerous complex software systems. Since the translation of binary executables into instruction sets results in many execution paths which must be analyzed for executability and for probability of execution, this requires large amounts of computational power to make up for the absence of high-level semantic structure in binary code. By combining a combination of fuzzers, emulation techniques and formal models and heuristics to reason about binary programs alongside advanced statistical learning and machine learning models can drive substantial improvement in initial evaluation of the binaries as well as contextualization of its potential impact or interaction with target systems on which it may be present.

What is needed is a system and methods that combines sandboxed malware analysis and automated patch development, deployment and validation (both local and system-wide), and further, a system which can use state-of-the-art machine learning techniques, simulation and modeling, and artificial intelligence paradigms to improve decision-making about patching and evolve how malware analysis and response keeps pace with the advancement of malware and software development in the world.

SUMMARY OF THE INVENTION

Accordingly, the inventor has conceived and reduced to practice, in a preferred embodiment of the invention, a system and methods for sandboxed software analysis with automated vulnerability detection and patch development, deployment and validation alongside technology and business risk analysis. The following non-limiting summary of the invention is provided for clarity, and should be construed consistently with embodiments described in the detailed description below.

To solve the problem of malware advancing beyond the capabilities of existing antimalware detection and response capabilities, a system and methods have been devised comprising a specialized business operating system, the ability to convert files into binary instructions to be executed in a sandbox environment, machine learning capabilities, a cybersecurity scoring system, pattern matching heuristics, in a system designed to find vulnerabilities present in networks and files on a computer system, analyze the vulnerabilities and exploits present, develop software patches for the vulnerabilities and exploits, evaluate risk from patching and deployment, and deploy (and optionally roll-back) the software patches autonomously, as well as learn from and evolve according to present and emerging malware techniques using machine learning and simulation techniques.

According to a first aspect, a system for sandboxed software analysis with automated vulnerability detection, comprising: a computing device comprising a memory and a processor; a business operating system comprising a first plurality of programming instructions stored in the memory of, and operating on the processor of, the computing device, wherein the first plurality of programming instructions, when operating on the processor, cause the computing device to: receive a file comprising executable machine code; identify a type of device on which the executable machine code will operate; transfer the executable machine code to a sandbox environment, the sandbox environment comprising a controlled environment that emulates functionality of the identified type of device resulting in both execution instructions and functional descriptions of the software instructions; receive an identified vulnerability from the sandbox environment where the execution instructions deviate from the intended functional description; and change an operational behavior of a real device of the identified type of device to prevent exploitation of the identified vulnerability through either address space layout randomization or data execution prevention or modification or removal of the offending binary instruction set, is disclosed.

According to a further aspect, a method for sandboxed software analysis with automated vulnerability detection, comprising the steps of: receiving, at a business operating system, a file comprising executable machine code; identifying a type of device on which the executable machine code will operate; transferring the executable machine code to a sandbox environment, the sandbox environment comprising a controlled environment that emulates functionality of the identified type of device; determining the functional instruction set and actual instruction set, receiving an identified vulnerability from the sandbox environment that might be exploitable or where functional and actual instruction sets deviate; and changing an operational behavior of a real device of the identified type of device to prevent exploitation or reduce impact of the identified vulnerability through either address space layout randomization or data execution prevention or dynamic instruction set blocking or modification, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE DRAWING FIGURES

Figure 1:
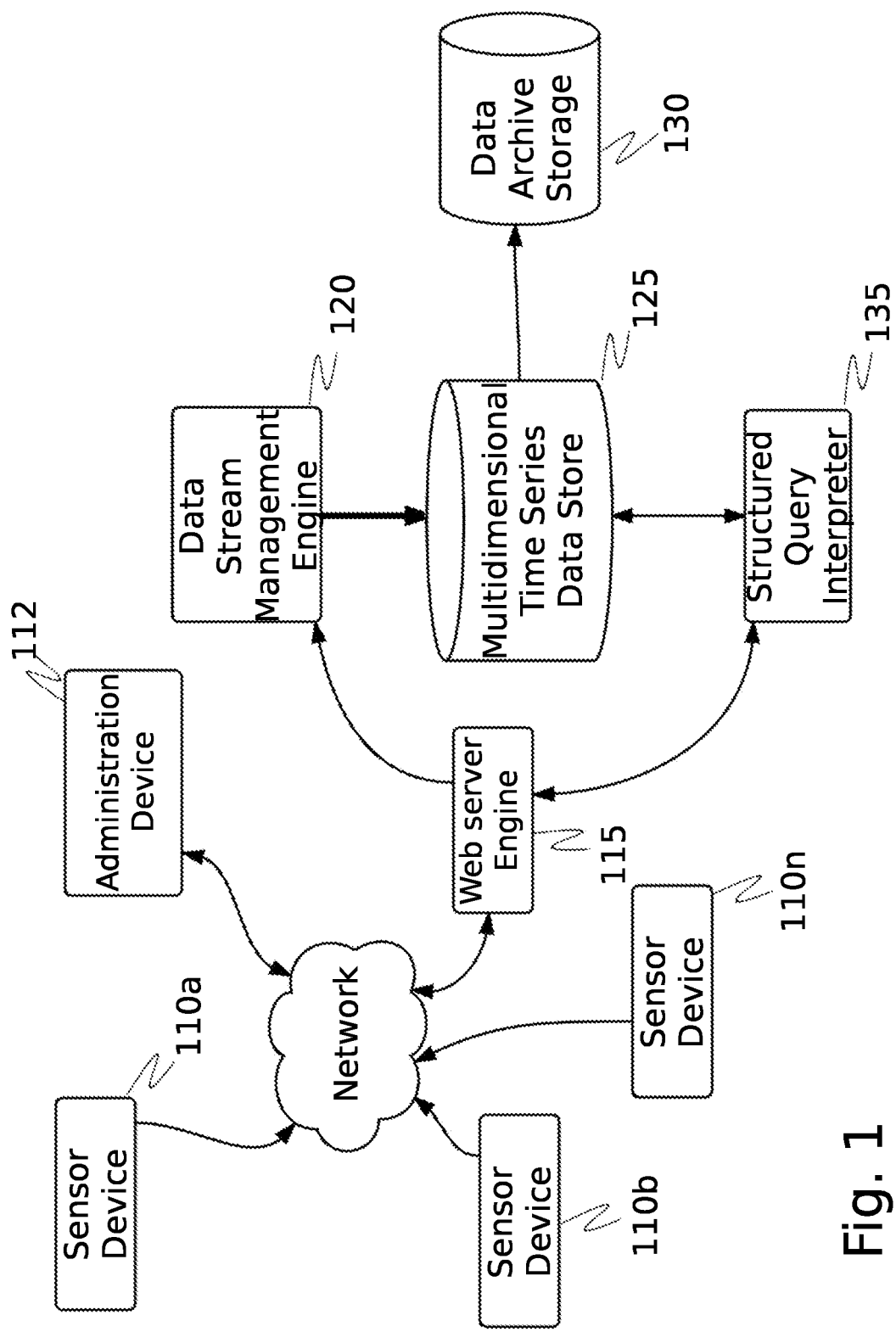
FIG. 1 is a diagram of an exemplary architecture of a system for the capture and storage of time series data from sensors with heterogeneous reporting profiles according to a preferred aspect of the invention.

The inventor has conceived, and reduced to practice, a system and methods for sandboxed software analysis with automated vulnerability or exploitation detection and patch development, deployment and validation at a local, network and business process level.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

FIG. 1 is a diagram of an exemplary architecture of a system for the capture and storage of time series data from sensors with heterogeneous reporting profiles according to a preferred aspect of the invention 100. In this embodiment, a plurality of sensor devices 110a-n stream data to a collection device, in this case a web server acting as a network gateway 115. These sensors 110a-n can be of several forms, some non-exhaustive examples being: physical sensors measuring humidity, pressure, temperature, orientation, and presence of a gas; or virtual such as programming measuring a level of network traffic, memory usage in a controller, and number of times the word "refill" is used in a stream of email messages on a particular network segment, to name a small few of the many diverse forms known to the art. In the embodiment, the sensor data is passed without transformation to the data management engine 120, where it is aggregated and organized for storage in a specific type of data store 125 designed to handle the multidimensional time series data resultant from sensor data. Raw sensor data can exhibit highly different delivery characteristics. Some sensor sets may deliver low to moderate volumes of data continuously. It would be infeasible to attempt to store the data in this continuous fashion to a data store as attempting to assign identifying keys and store real time data from multiple sensors would invariably lead to significant data loss. In this circumstance, the data stream management engine 120 would hold incoming data in memory, keeping only the parameters, or "dimensions" from within the larger sensor stream that are pre-decided by the administrator of the study as important and instructions to store them transmitted from the administration device 112. The data stream management engine 120 would then aggregate the data from multiple individual sensors and apportion that data at a predetermined interval, for example, every 10 seconds, using the timestamp as the key when storing the data to a multidimensional time series data store over a single swimlane of sufficient size. This highly ordered delivery of a foreseeable amount of data per unit time is particularly amenable to data capture and storage but patterns where delivery of data from sensors occurs irregularly and the amount of data is extremely heterogeneous are quite prevalent. In these situations, the data stream management engine cannot successfully use strictly single time interval over a single swimlane mode of data storage. In addition to the single time interval method the invention also can make use of event based storage triggers where a predetermined number of data receipt events, as set at the administration device 112, triggers transfer of a data block consisting of the apportioned number of events as one dimension and a number of sensor ids as the other. In the embodiment, the system time at commitment or a time stamp that is part of the sensor data received is used as the key for the data block value of the value-key pair. The invention can also accept a raw data stream with commitment occurring when the accumulated stream data reaches a predesigned size set at the administration device 112.

It is also likely that that during times of heavy reporting from a moderate to large array of sensors, the instantaneous load of data to be committed will exceed what can be reliably transferred over a single swimlane. The embodiment of the invention can, if capture parameters pre-set at the administration device 112, combine the data movement capacity of two or more swimlanes, the combined bandwidth dubbed a metaswimlane, transparently to the commit-ting process, to accommodate the influx of data in need of commitment. All sensor data, regardless of delivery circumstances are stored in a multidimensional time series data store 125 which is designed for very low overhead and rapid data storage and minimal maintenance needs to sap resources. The embodiment uses a key-value pair data store examples of which are Riak, Redis and Berkeley DB for their low overhead and speed, although the invention is not specifically tied to a single data store type to the exclusion of others known in the art should another data store with better response and feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example one group of developers restrict the size of their multidimensional time series key-value pair data store to approximately $8.64 \times 10^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 130. This archival storage might be locally provided by the user, might be cloud based such as that offered by Amazon Web Services or Google or could be any other available very large capacity storage method known to those skilled in the art.

Reliably capturing and storing sensor data as well as providing for longer term, offline, storage of the data, while important, is only an exercise without methods to repetitively retrieve and analyze most likely differing but specific sets of data over time. The invention provides for this requirement with a robust query language that both provides straightforward language to retrieve data sets bounded by multiple parameters, but to then invoke several transformations on that data set prior to output. In the embodiment isolation of desired data sets and transformations applied to that data occurs using pre-defined query commands issued from the administration device 112 and acted upon within the database by the structured query interpreter 135. Below is a highly simplified example statement to illustrate the method by which a very small number of options that are available using the structured query interpreter 135 might be accessed:

```
SELECT [STREAMING | EVENTS] data_spec FROM [unit] timestamp TO timestamp
GROUPBY (sensor_id, identifier) FILTER [filter_identifier] FORMAT [sensor [AS
identifier] [, sensor [AS identifier]] ... ] (TEXT | JSON | FUNNEL | KML | GEOJSON |
TOPOJSON);
```

Here "data spec" might be replaced by a list of individual sensors from a larger array of sensors and each sensor in the list might be given a human readable identifier in the format "sensor AS identifier". "unit" allows the researcher to assign a periodicity for the sensor data such as second (s), minute (m), hour (h). One or more transformational filters, which include but a not limited to: mean, median, variance, standard deviation, standard linear interpolation, or Kalman filtering and smoothing, may be applied and then data formatted in one or more formats examples of with are text, JSON, KML, GEOJSON and TOPOJSON among others known to the art, depending on the intended use of the data.

Figure 2:
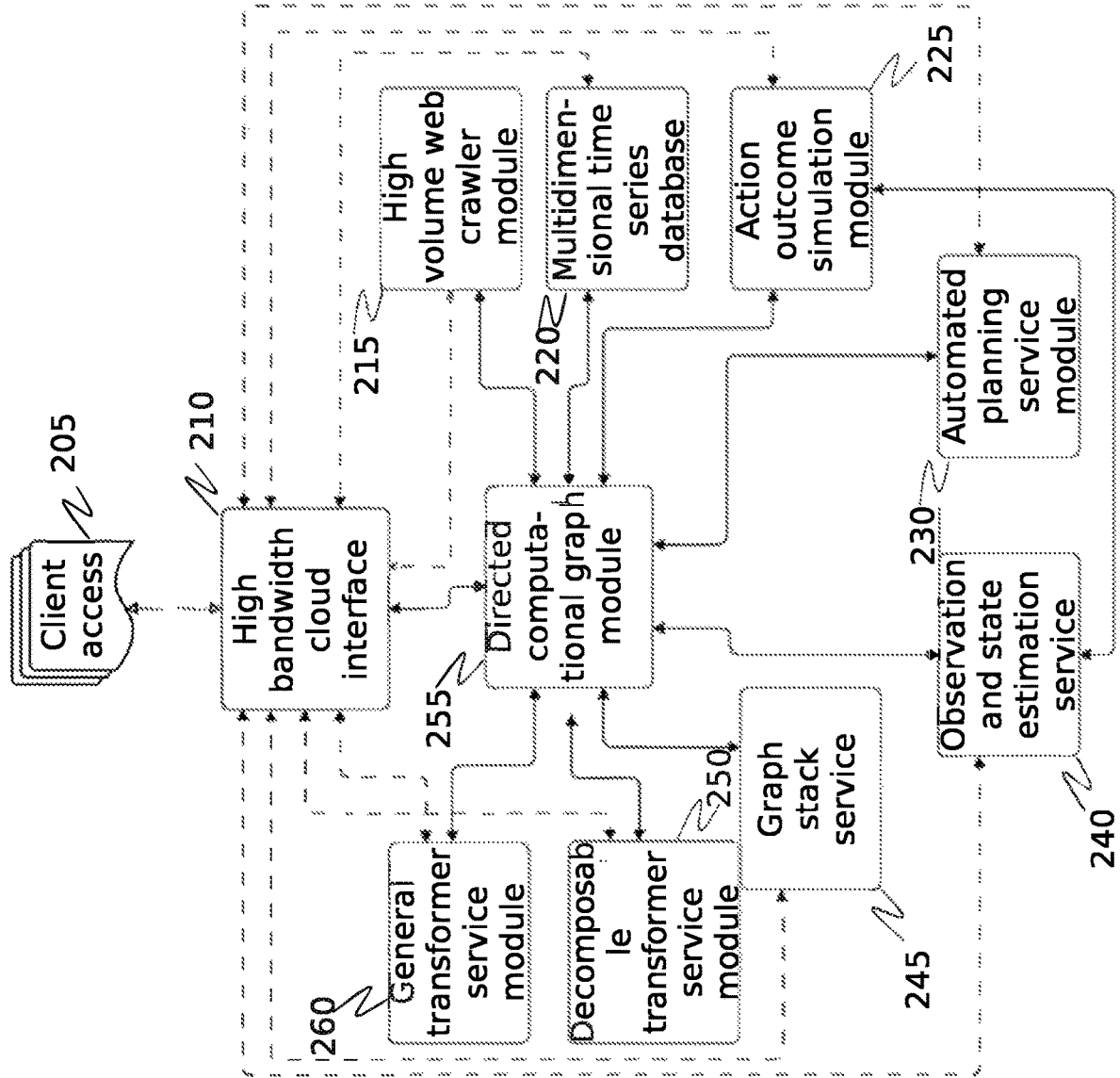
FIG. 2 is a diagram of an exemplary architecture of a business operating system according to a preferred aspect of the invention.

FIG. 2 is a diagram of an exemplary architecture of a business operating system 200 according to a preferred aspect. Client access to the system 205 both for system control and for interaction with system output such as automated predictive decision making and planning and alternate pathway simulations, occurs through the system's highly distributed, very high bandwidth cloud interface 210 which is application driven through the use of the Scala/Lift development environment and web interaction operation mediated by AWS ELASTIC BEANSTALK™, both used for standards compliance and ease of development. Much of the business data analyzed by the system both from sources within the confines of the client business, and from cloud based sources, also enter the system through the cloud interface 210, data being passed to the analysis and transformation components of the system, the directed computational graph module 255, high volume web crawling module 215 and multidimensional time series database 220. The directed computational graph retrieves one or more streams of data from a plurality of sources, which includes, but is in no way not limited to, a number of physical sensors, web based questionnaires and surveys, monitoring of electronic infrastructure, crowd sourcing campaigns, and human input device information. Within the directed computational graph, data may be split into two identical streams, wherein one sub-stream may be sent for batch processing and storage while the other sub-stream may be reformatted for transformation pipeline analysis. The data is then transferred to general transformer service 260 for linear data transformation as part of analysis or decomposable transformer service 250 for branching or iterative transformations that are part of analysis. The directed computational graph 255 represents all data as directed graphs where the transformations are nodes and the result messages between transformations edges of the graph. These graphs which contain considerable intermediate transformation data are stored and further analyzed within graph stack module 245. High volume web crawling module 215 uses multiple server hosted preprogrammed web spiders to find and retrieve data of interest from web based sources that are not well tagged by conventional web crawling technology. Multiple dimension time series database module 220 receives data from a large plurality of sensors that may be of several different types. The module is designed to accommodate irregular and high volume surges by dynamically allotting network bandwidth and server processing channels to process the incoming data. Data retrieved by the multidimensional time series database 220 and the high volume web crawling module 215 may be further analyzed and transformed into task optimized results by the directed computational graph 255 and associated general transformer service 250 and decomposable transformer service 260 modules.

Results of the transformative analysis process may then be combined with further client directives, additional business rules and practices relevant to the analysis and situational information external to the already available data in the automated planning service module 230 which also runs powerful predictive statistics functions and machine learning algorithms to allow future trends and outcomes to be rapidly forecast based upon the current system derived results and choosing each a plurality of possible execution instructions, technical system impact, or resulting business process impacts or associated decisions. Using all available data, the automated planning service module 230 may propose business decisions most likely to result is the most favorable business outcome with a usably high level of certainty. Closely related to the automated planning service module in the use of system derived results in conjunction with possible externally supplied additional information in the assistance of end user business decision making, the business outcome simulation module 225 coupled with the end user facing observation and state estimation service 240 allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 200 has data from them, which no one really studied due to the great volume of columnar figures, so the alternative courses 225, 240 of action are run. The system, based on all available data predicts that the fouled sensor or pump are unlikely the root cause this time due to other available data and the contractor is dispatched. She finds a small breach in the pipeline. There will be a small cleanup and the pipeline needs to be shut down for repair but multiple tens of millions of dollars have been saved. This is just one example of a great many of the possible use of the business operating system, those knowledgeable in the art will easily formulate more.

Figure 3:
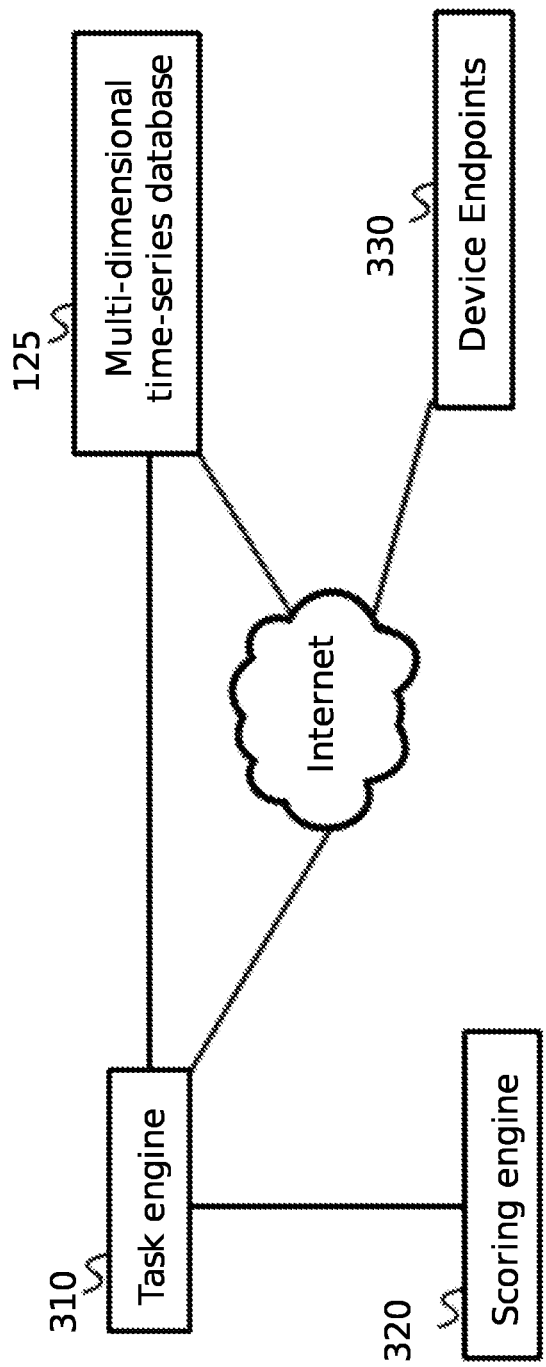
FIG. 3 is a diagram of an exemplary architecture of a cybersecurity analysis system according to a preferred aspect of the invention.

FIG. 3 is a system diagram, illustrating the connections between crucial components, according to an aspect of the invention. Core components include a scheduling task engine 310 which will run any processes and continue with any steps desired by the client, as described in further methods and diagrams in the disclosure. Tasks may be scheduled to run at specific times, or run for certain given amounts of time, which is commonplace for task scheduling software and systems in the art. This task engine 310 is then connected to the internet, and possibly to a single or plurality of local Multi-Dimensional Time-Series Databases (MDTSDB) 125. It is also possible to be connected to remotely hosted and controlled MDTSDB's 125 through the Internet, the physical location or proximity of the MDTSDB for this disclosure not being a limiting factor. In such cases as the MDTSDB 125 is not hosted locally, it must also maintain a connection to the Internet or another form of network for communication with the task engine 310. Device endpoints 330, especially Internet-of-Things (IoT) devices, are also by definition connected to the internet, and in methods described in later figures will be used for cybersecurity analysis and risk assessment. The task engine 310 which will perform the scheduling and running of the methods described herein also maintains a connection to the scoring engine 320, which will be used to evaluate data gathered from the analysis and reconnaissance tasks run by the task scheduling engine 310.

Figure 4:
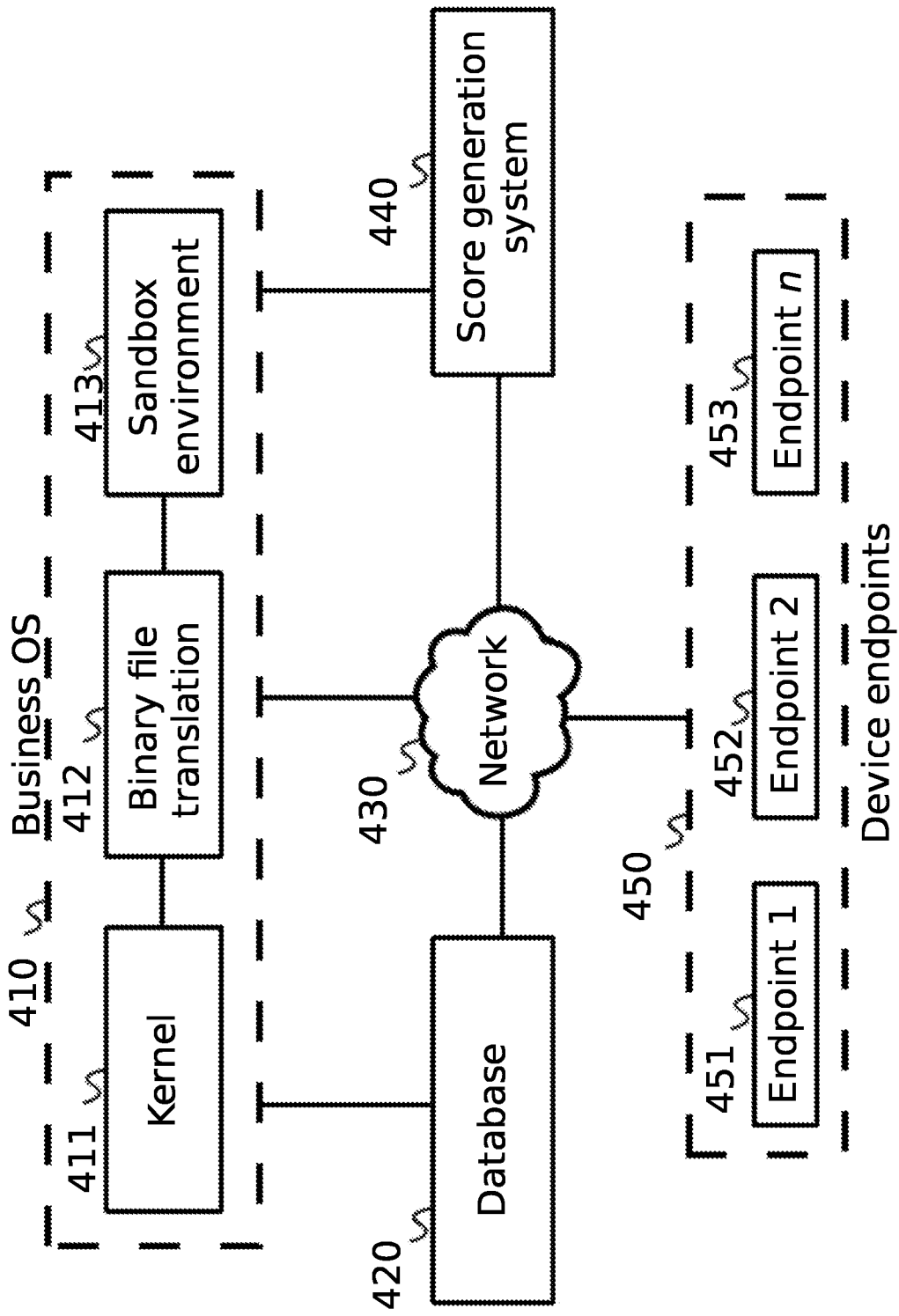
FIG. 4 is a system diagram illustrating connections between important components for analyzing software and network-connected endpoints, according to a preferred aspect.

FIG. 4 is a system diagram illustrating connections between important components for analyzing software and network-connected endpoints, according to a preferred aspect. A business operating system (OS) 410 operates on a system outlined in FIG. 2, with key components including the OS kernel 411 which is a component common to all operating systems, and on that kernel, aside from other pieces of software for other purposes, are two important engines, a binary file translator 412 and a sandbox simulation environment 413. A binary file translator 412 may convert any given file or set of input data into executable machine code, and a sandbox environment 413 is a simulation environment which may execute machine code in a closed-off environment, similar in purpose to an experiment carried out in a sealed room. This may be done in a variety of ways, including emulator software for specific system architectures and open source code executors. Such an OS 410 would be connected to a database 420, which may be formatted in Structured Query Language (SQL) form, formatted raw text, encrypted text, or no-SQL forms, and may be used in conjunction with management software such as APACHE HADOOP™ for increased performance. This connection may be either a direct physical connection, or the OS 410 and database 420 may be located on the same physical machine, or they may be connected over a network 430, including the Internet or other kinds of computer networks. Similarly, a score generation system 440 may be connected to the operating system 410, either through a network 430, or through a direct physical connection, or by operating on the same machine as the operating system 410 itself. This scoring engine is used in later figures to prioritize software vulnerabilities and exploits. A variety of device endpoints 450 may be connected over a network 430 and accessible to the operating system 410, by use of endpoint instrumentation such as OSQUERY™ or commercial tools such as Tanium, and these device endpoints may be varied in form, including laptop computers, desktops, mobile phones, and various Internet of Things (IoT) devices. It is possible for only one endpoint 451 to be connected, and it is similarly possible for a multitude of various different endpoints to be connected 452, 453.

Figure 5:
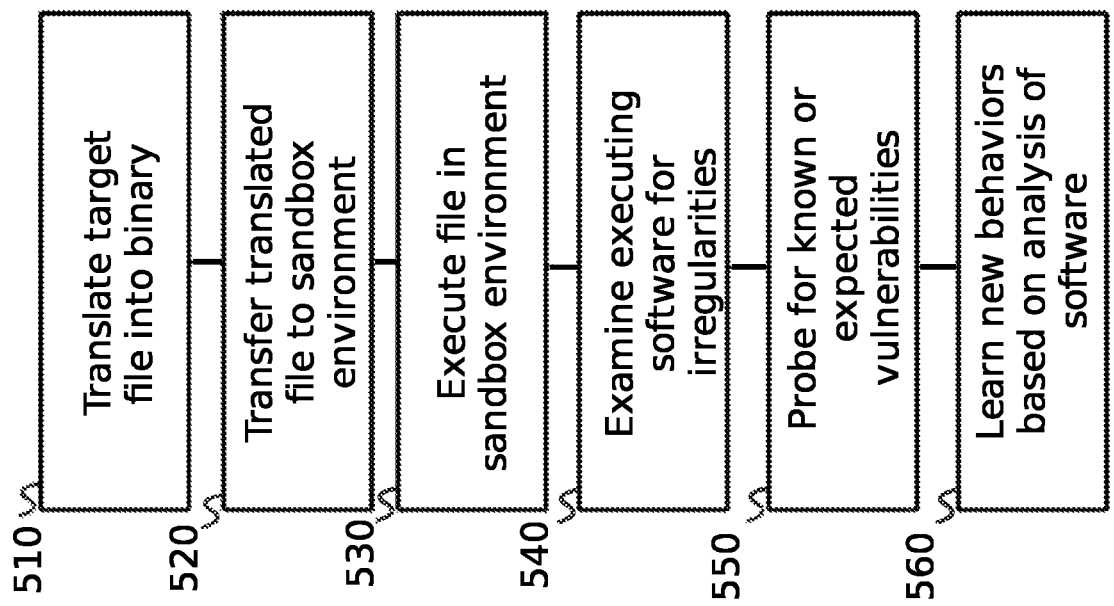
FIG. 5 is a method diagram illustrating important steps in detecting and analyzing software exploits or vulnerabilities, according to a preferred aspect of the invention.

FIG. 5 is a method diagram illustrating important steps in detecting and analyzing software exploits or vulnerabilities, according to a preferred aspect of the invention. A file that is targeted for analysis may be translated into executable binary code 510 by use of a binary translation engine 412, and this executable binary code may then be transferred to a sandbox environment 520, 413, for analysis. The sandbox environment noted herein may be a sandbox for execution or may in-fact be a full chip emulation engine capable of taking the instruction set (e.g. LLVM) and evaluating the specific instructions to determine viable, intended, and actual execution paths in the software given at least one inputs. Separately, the ability to run a fuzzer, i.e. modifying the inputs or data being evaluated and studying variance in the execution of the software instructions in an emulation engine or on actual virtualized or physical hardware is explicitly noted. Furthermore, in a preferred embodiment of the invention, a decision-engine may compare the results of specific hardware, virtualized hardware, and emulation engines to determine additional information about specific interactions of the software or a potential attack (to include attacks on supply chain which may compromise physical equipment) in specific instruction sets. The specific environment in use may vary depending on the code generated by the binary translation engine 412, including hardware emulators, operating system emulators, and more. The executable binary code is then executed in the simulated environment 530, and the operating system then may examine the executing software for any irregularities 540. Irregularities include activities not normally performed by benign software including memory scanning, and deletion of the executable binary during execution (but the executing code remaining in memory), which are known patterns of malware to avoid detection and elimination. Attempted access of system files, permissions, settings, or network adapters in suspicious ways may also be classified as "irregularities," though the characterization and scope of what the operating system 410 looks for may grow and change over time as cybersecurity and malware both advance. The operating system may also probe the executing software for vulnerabilities and exploits 550, which will often be known forms of attack, such as the Heartbleed exploit in OPENSSL™, and are known to many skilled in the art of cybersecurity. The types of vulnerabilities and exploits probed for may change and grow as cybersecurity advances as a field. The operating system 410 may then learn new behaviors 560 according to the results of analysis, for example the operating system 410 may probe for the Heartbleed exploit 550 in a piece of software to see if it is prone to that exploit, and if it is, the operating system may be trained look for similar execution patterns in future software analyses to determine if a piece of software is likely to be vulnerable to the same exploit, an example of reinforcement learning 560. This may be achieved in numerous ways common in the art including neural networks, a basic decision weight system, and more, all common concepts in computer science and software development as a whole.

Figure 6:
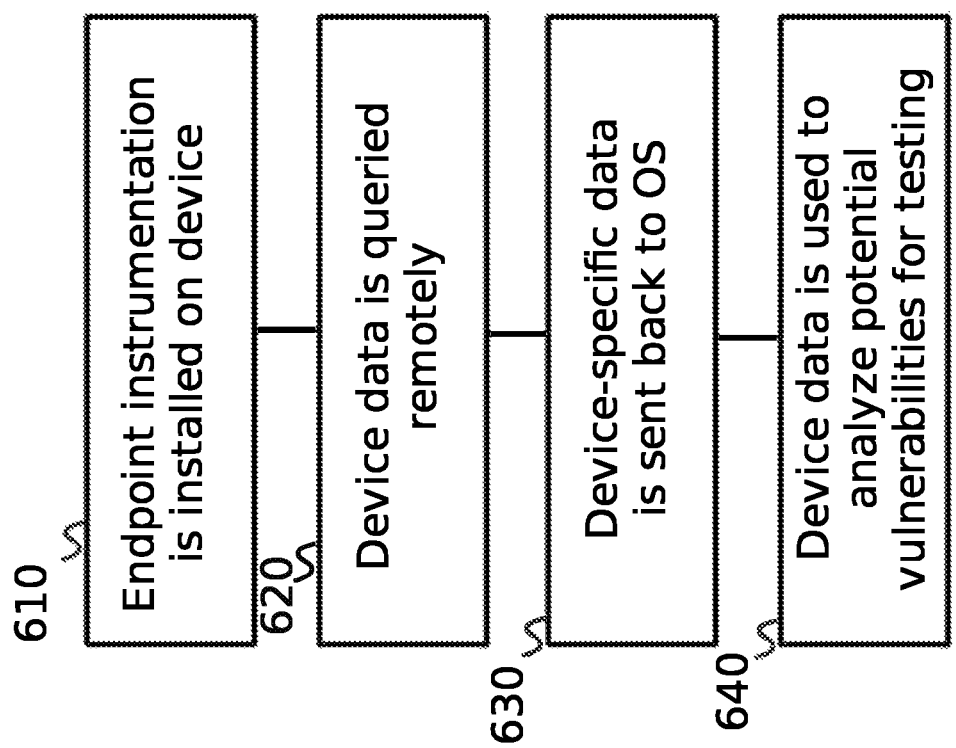
FIG. 6 is a method diagram illustrating the use of advanced endpoint instrumentation to collect data on endpoint devices across a network, according to a preferred aspect.

FIG. 6 is a method diagram illustrating the use of advanced endpoint instrumentation to collect data on endpoint devices across a network, according to a preferred aspect. First, the network endpoint must have the instrumentation installed before it can be utilized 610, and some common instrumentations include OSQUERY™ and open source fleet management software including "doorman," an open source fleet management suite for OSQUERY™. Software such as OSQUERY™ allows devices to be queried and scanned similar to data files or databases, so that property and/or relational data about the device may be scanned easily and swiftly by an authorized user, in this case the business operating system 410. Once a form of instrumentation software is installed onto the endpoints used in the system 610, device data may be remotely queried by the business operating system 620, similar to a database query over the internet. Device data is then sent back to the machine hosting the business operating system 630, which is then analyzed for potential vulnerability profiling 640. For example, certain phones that may be used in this system have various exploits and vulnerabilities that are exclusive to each other, as do many older operating systems for personal computers, and this information would be able to be queried for analysis 640.

Figure 7:
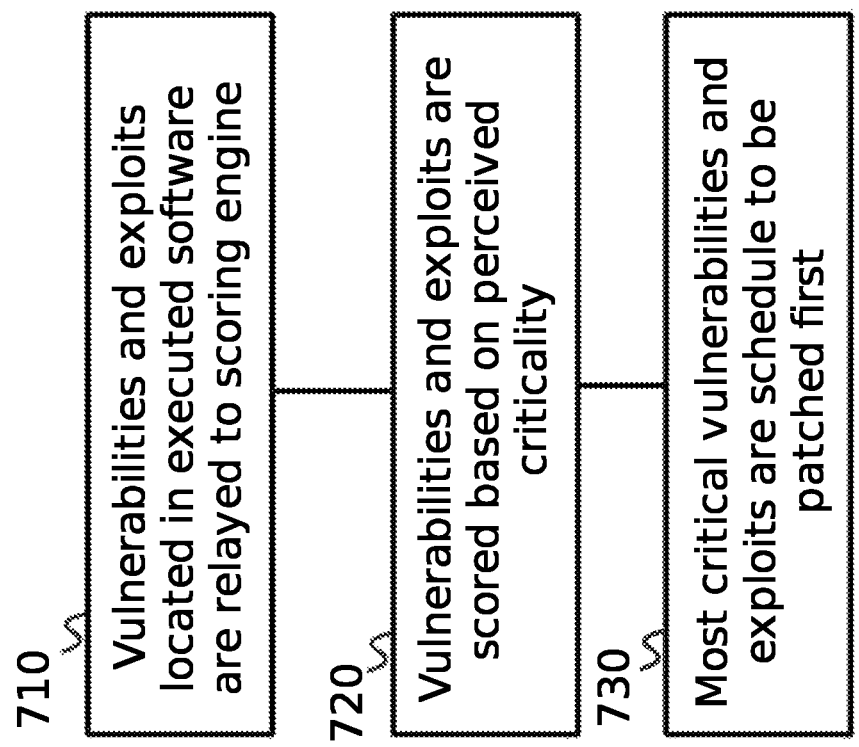
FIG. 7 is a method diagram illustrating the prioritization of software flaws and exploits according to a preferred aspect.

FIG. 7 is a method diagram illustrating the prioritization of software flaws and exploits according to a preferred aspect. Vulnerabilities and exploits found in software executed in the sandbox environment 413 are relayed to the scoring engine 440, 710, which may be either a connection over a network 430 or a direct physical connection between only the two machines, or both the scoring engine 440 and operating system 410 may be operating on the same computing device. The vulnerabilities and exploits found in the software execution may then be scored by the scoring engine 720, which will assign a higher risk level to exploits which may involve deleting system critical files, highly evasive code techniques which may evade most forms of antivirus software, and more, using a scoring methodology which may be specified and changed at any time by the user of the software. The scoring methodology may be arbitrary or follow any given set of rules specified by the user of the software, the importance of this being that as cybersecurity and malware advance, the need for a changing and advancing ranking of threats is obvious and immediate-what was considered a horrible computer virus 15 years ago may be easily detectable today, and similarly, what is considered incredibly high-risk today may be of no consequence to antivirus software 15 years from now, and therefore be categorized as a low threat to most devices. Regardless, at the time of execution, the scoring engine 440 will then inform the operating system 410 of a ranking of the found vulnerabilities or threats in the executed software 730, ranking the issues found from most dangerous or pressing, to least dangerous or pressing. Additionally, the system may be able to compare the results across multiple real-world entities, virtualized hardware, and emulation engines—this may be particularly important in cases where supply chain security is suspect and analysis of execution deviations across a cohort of physical or virtualized machines may be desirable for defenders.

Figure 8:
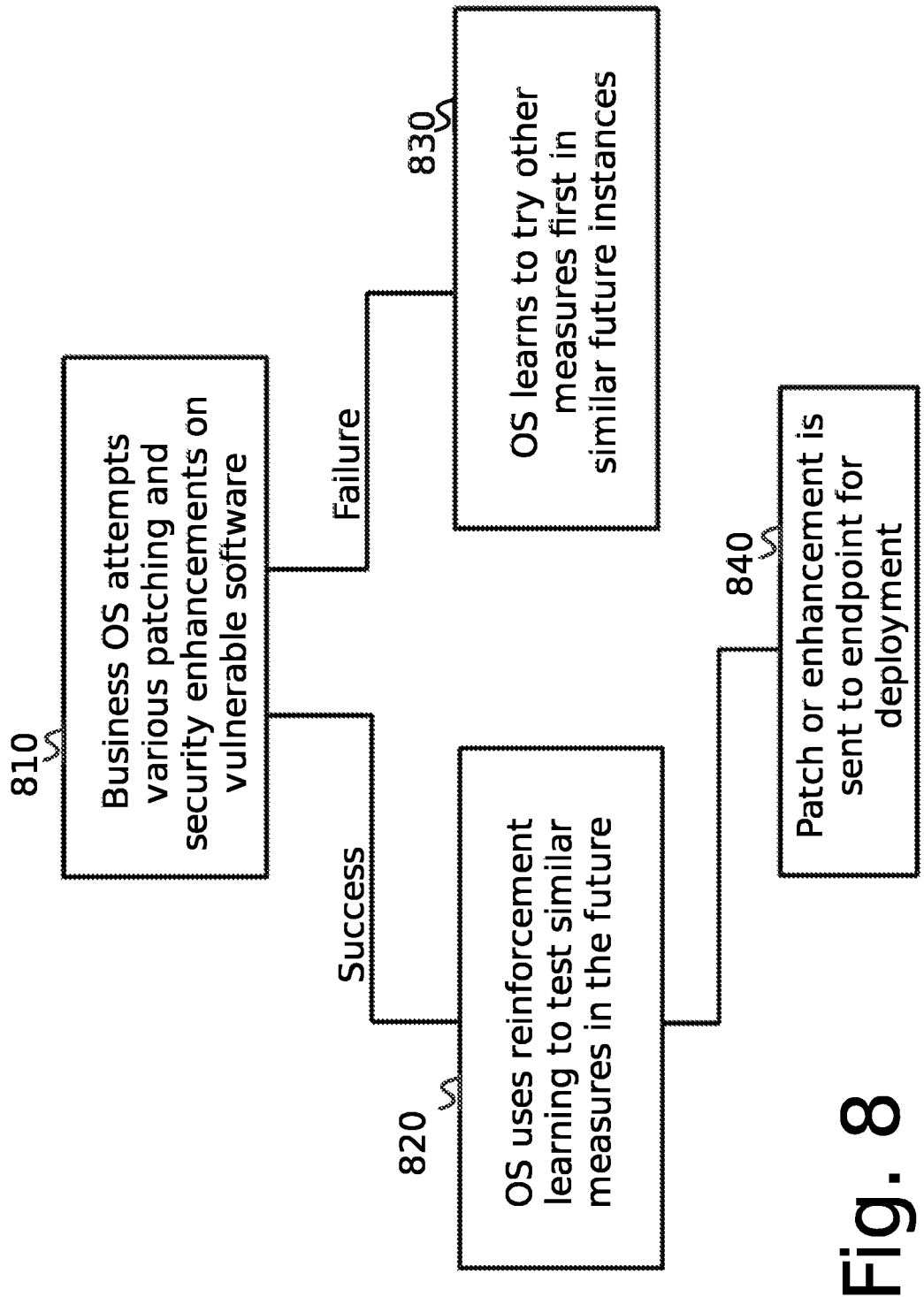
FIG. 8 is a method diagram illustrating the basic steps for patching exploits and vulnerabilities in analyzed software, according to an aspect.

FIG. 8 is a method diagram illustrating the basic steps for patching exploits and vulnerabilities in analyzed software, according to an aspect. After receiving a list of exploitable or dangerous behaviors from a simulated piece of software 730, the business operating system 410 will attempt to make any of various changes or limitations implementable at the kernel level to the software's execution 810, to "patch" the vulnerability or threat. Such measures may include techniques such as Address Space Layout Randomization (ASLR), a memory protection process which randomizes the location in computer memory where system executable code is loaded, and measures used to patch undesirable behavior or vulnerabilities may include other techniques including data execution prevention (DEP), which prevents certain sectors of memory from being executed, protecting potentially important system processes from attack. There are a large variety of security measures that may be implemented in an effort to patch software behavior, and the importance of noting that it is to patch behavior is that the system is not analyzing the code itself and re-writing code in software to be permanently patched, but rather it is changing system behavior based on observed software behavior to protect against any behavior that is either vulnerable to exploitation, or is itself malware. If an implemented patch does not solve the undesired behavior or vulnerability in the tested software, and is deemed a failure, then the operating system 410 may learn through reinforcement learning algorithms to try different measures first, if the same behavior occurs during analysis of a different piece of software 830. If the implemented patch or hotfix does stop the undesirable behavior, and is deemed a success, the operating system 410 learns, conversely to the previous situation, that this patch is an effective measure against such behaviors, and will try it sooner than other (either untested or possibly ineffective) measures that it may have tried 820. This patch or enhancement to the software's functionality is then sent to the endpoint 450, 840 which hosted this file or piece of software that was being analyzed, so that the undesired behavior or vulnerability is effectively mitigated.

Figure 13:
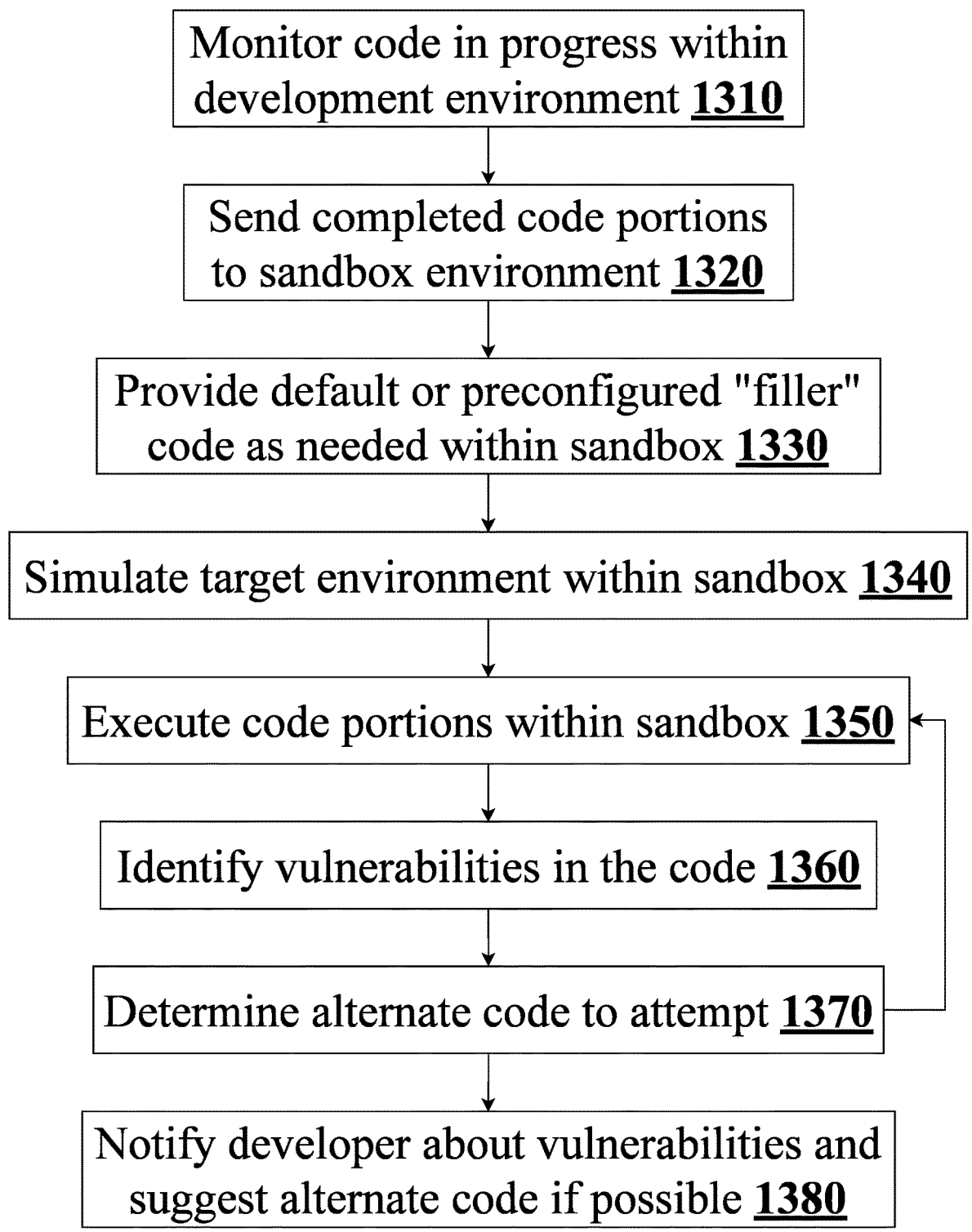
FIG. 13 is a flow diagram illustrating an exemplary method for identifying a vulnerability in code during development, according to an aspect.

FIG. 13 is a flow diagram illustrating an exemplary method for identifying a vulnerability in code during development, according to an aspect. According to the illustrated method, code may be monitored and analyzed for vulnerabilities during the development phase, and patches to address identified vulnerabilities may be suggested to developers to expedite the development process. As code is being written in a development environment, it may be monitored 1310 and portions of completed code (such as, for example including but not limited to, subroutines, libraries, or entire files) may be sent to a sandbox environment as they are completed 1320 or otherwise marked for testing (for example, a developer may indicate that a portion of code is ready to be analyzed for vulnerabilities, even though it may not yet be "final"). The sandbox environment may optionally provide any necessary program code 1330 to fill in gaps necessary for operation, such as dependencies, libraries, or other prerequisites, as well as provide a simulated environment designed to replicate a target environment 1340 for the code under development (that is, an environment in which the code is intended to operate). With these parameters in place, the code portions may then be compiled and executed 1350, running the developmental code within the sandbox environment as it would run on a target system if deployed. The running code may then be analyzed to identify any potential vulnerabilities 1360, for example by identifying irregularities in the actual operation compared to what was expected. Alternate code may be generated and tested 1370 to attempt to remedy any identified vulnerabilities, in an iterative process wherein code is compiled and executed, checked for vulnerabilities, then alternate code is generated based on a potential solution to an identified vulnerability, and then the alternate code is in turn compiled, executed, and analyzed, continuing until either an iteration threshold is reached or all identified vulnerabilities have been addressed. The developer of the original code portions may then be notified of any identified vulnerabilities, as well as any suggested alternate code that was found to address any of the vulnerabilities 1380. In this manner, program code may be continually checked for issues and suggestions provided for addressing those issues during development, without the need to complete and publish code and then analyze actual deployed operation for vulnerabilities. Thus it can be seen that this method streamlines the development process and helps reduce the need for debugging vulnerabilities within published code that is being run on live systems, instead resolving such issues before the code is ever published and run-thereby improving the user experience for those running the code, avoiding complications involved with vulnerabilities that would have otherwise gone undetected until they occurred in live systems, and reducing developer workload.

Figure 14:
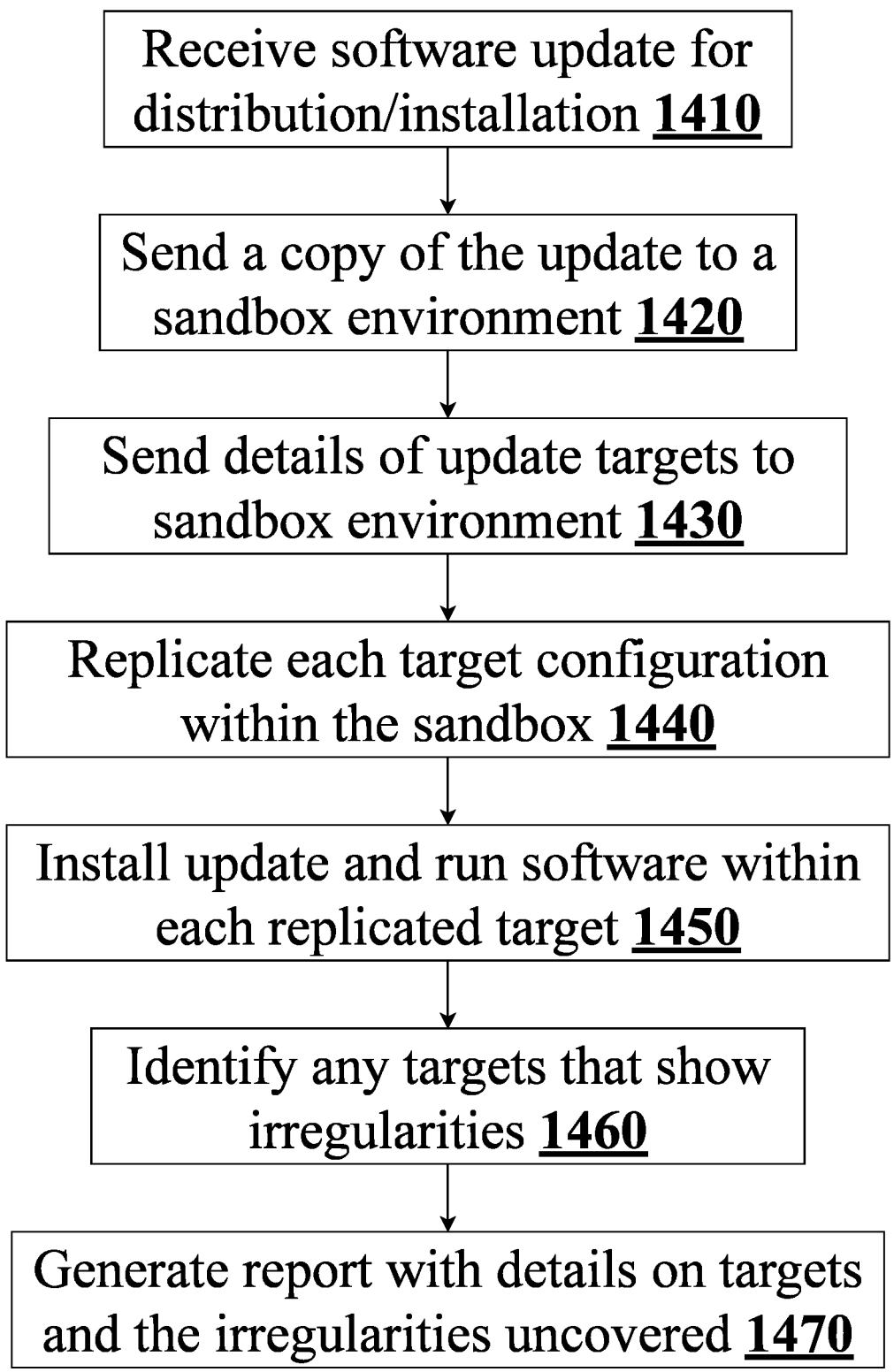
FIG. 14 is a flow diagram illustrating an exemplary method for identifying a vulnerability in a software update prior to installation, according to an aspect.

FIG. 14 is a flow diagram illustrating an exemplary method for identifying a vulnerability in a software update prior to installation, according to an aspect. According to this method, software updates may be checked for vulnerabilities prior to installation on a target system by simulating the details of the target system within a sandbox environment and executing the updated code to analyze its operation. When a software update is ready 1410 for distribution to, and installation on, a plurality of target devices such as (for example, including but not limited to) databases, servers, network hardware such as switches or routers, hardware firewalls, or personal computing devices such as laptop or tablet computers, a copy of the update may be sent 1420 to a sandbox environment for analysis prior to distribution. Details of a target system on which the update is to be installed may also be sent 1430, so that the target environment may be replicated within the sandbox 1440 to accurately model the expected execution of the code. This may include simulating hardware configurations such as using a virtual machine with specifically-configured processor, memory, networking, or other configuration, as well as the software environment of the target system including (but not limited to) operating system type and version, current version of the software to be updated, network and other software configurations, and other software packages that are known to be installed on the target system (for example, to identify any conflicts such as versioning or dependency issues that may be caused by multiple software packages relying on or updating a shared resource). The update may then be installed on the virtualized sandbox system 1450 and run as it would on the intended target system. The operation may be analyzed during runtime within the sandbox to identify any irregularities that indicate potential vulnerabilities 1460, and any identified irregularities may be reported along with the details of the simulated target system in which they were observed 1470, so that a developer or administrator may review the issues and adjust the deployment as needed.

Figure 15:
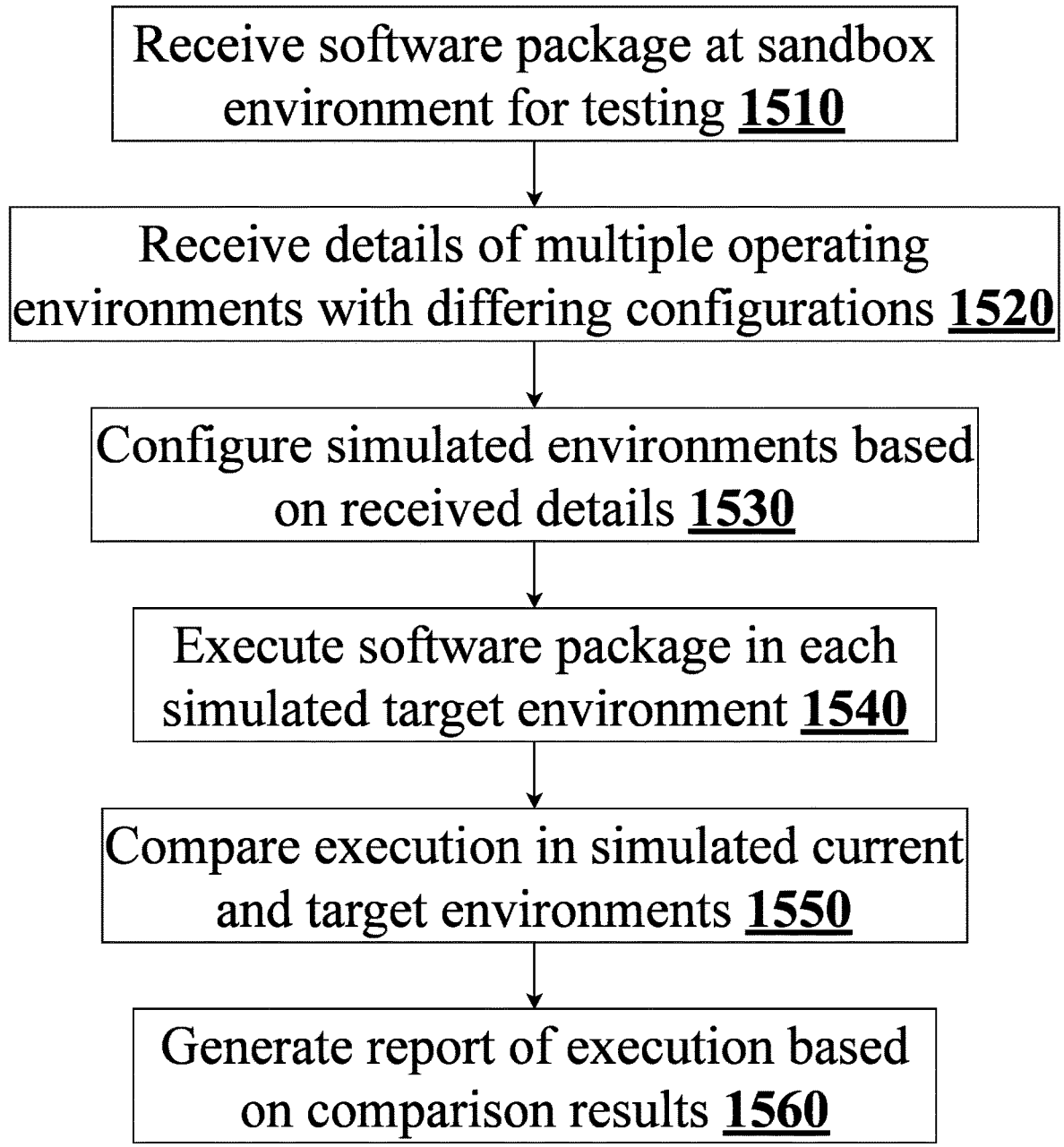
FIG. 15 is a flow diagram illustrating an exemplary method for identifying a vulnerability in a software program based on a change in operating environment, according to an aspect.

FIG. 15 is a flow diagram illustrating an exemplary method for identifying a vulnerability in a software program based on a change in operating environment, according to an aspect. According to this method, a sandbox environment may be used to compare the execution of a software package in different environments, to identify any differences or irregularities that may arise when software is run on devices with different hardware or software configurations, such as (for example, including but not limited to) different networking configuration, processor architecture, or operating system type or version. A sandbox environment may receive a software package 1510 as well as details of multiple operating environments 1520 that differ in their particular configuration. The environments may differ in any degree such as ranging from a simple change in operating system version or memory capacity, to large differences such as completely different hardware configuration and operating system type (for example, to compare execution of code being ported from one operating system type to another). A number of simulated environments may be created within the sandbox to replicate each of the received environment configurations 1530, and the software package may then be installed and executed within each simulated environment 1540. Installation and execution may then be analyzed and compared across the differing environments 1550, to generate a report of any irregularities or variances that occurred 1560; for example, installation may fail if not properly configured for a change in operating system type or processor architecture, software may function differently based on different configuration of hardware resources (such as slowdowns on an environment with insufficient memory other resources for execution), or execution may reveal a vulnerability that could be exploited that is dependent on a particular hardware or software configuration of the environment in which the software is executed (for example, particular networking configurations that may expose vulnerable aspects of the executed software). In this manner, the sandbox testing environment may be used not only to analyze software for vulnerabilities as described above (with reference to FIGS. 5, 7, 13-14), but also to comparatively analyze execution across multiple configurations to determine variations in the execution of the software.

Figure 16:
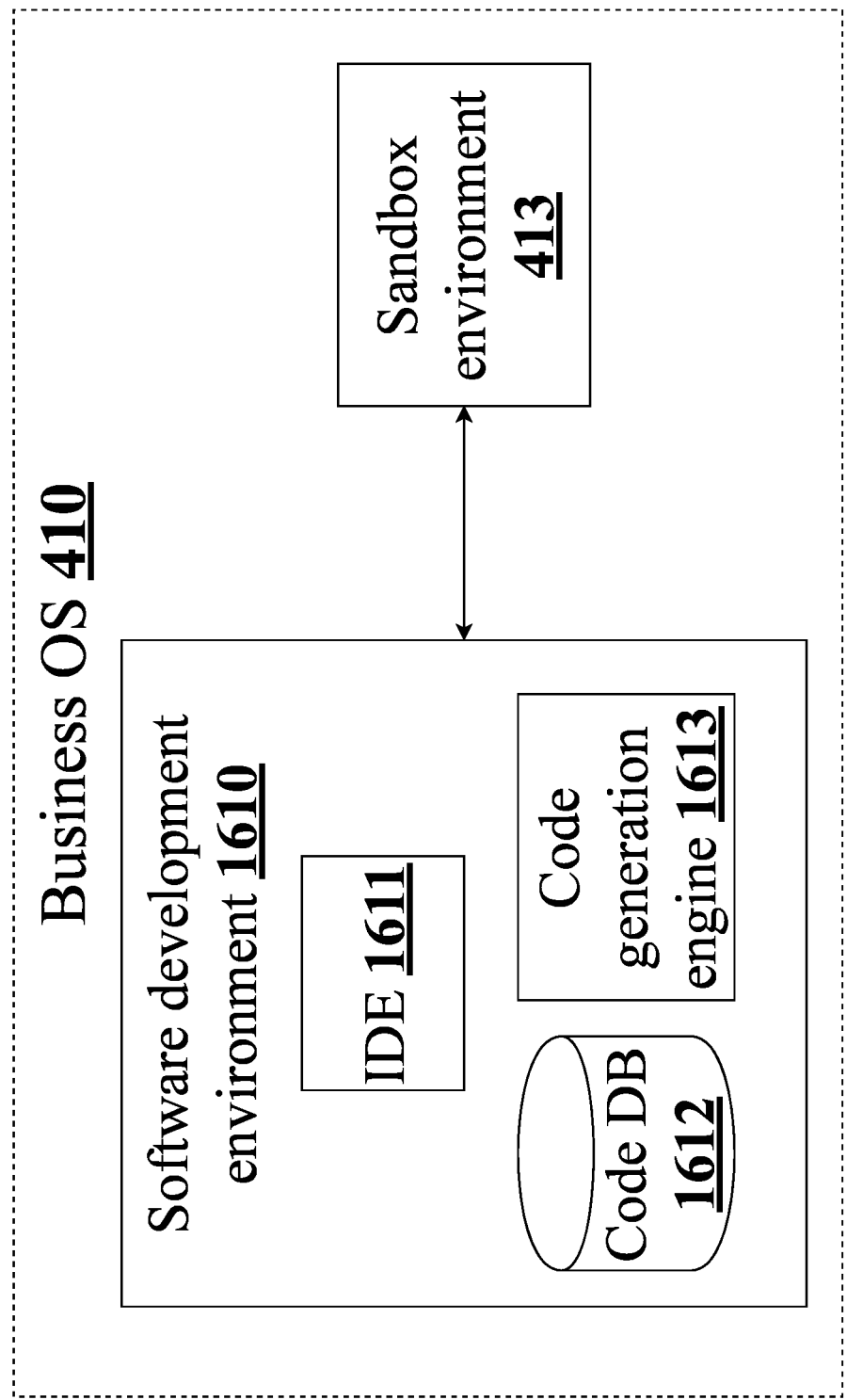
FIG. 16 is a block diagram illustrating the use of a software development environment within a business operating system in conjunction with a sandbox environment, according to an aspect.

FIG. 16 is a block diagram illustrating the use of a software development environment within a business operating system in conjunction with a sandbox environment, according to an aspect. As illustrated, a business OS 410 may comprise a software development environment 1610 comprising an integrated development environment (IDE) 1611 provides a user interface within which a developer may write, review, compile, test, or publish program code. A Code database 1612 may store portions of complete or incomplete code, as well as code samples that may be used to fill in portions of an executable program during development. A code generation engine 1613 may be used to automatically generate portions of program code, for example to create new code for use in filling in portions of an executable program or to generate alternative portions of code for testing purposes used by a sandbox environment 413 (as described above, with reference to FIG. 13). Code generation engine 1612 may employ a variety of machine learning techniques to refine its operation over time, for example (including, but not limited to) the use of convolutional neural networks, recurrent neural networks, or generative artificial intelligence, that may enable operation to improve in a learning fashion so that the quality and usefulness of generated code may improve automatically with time. During operation, sandbox environment 413 may prompt code generation engine 1613 to provide code portions for testing purposes as described previously, generating and testing alternate code to address identified irregularities during sandbox testing of development code. Identified alternate code may then be presented to a developer for review within IDE 1611, for example by providing a notification or interactive prompt for the developer to review the alternate code and the identified irregularity or irregularities that the alternate code addresses.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 9:
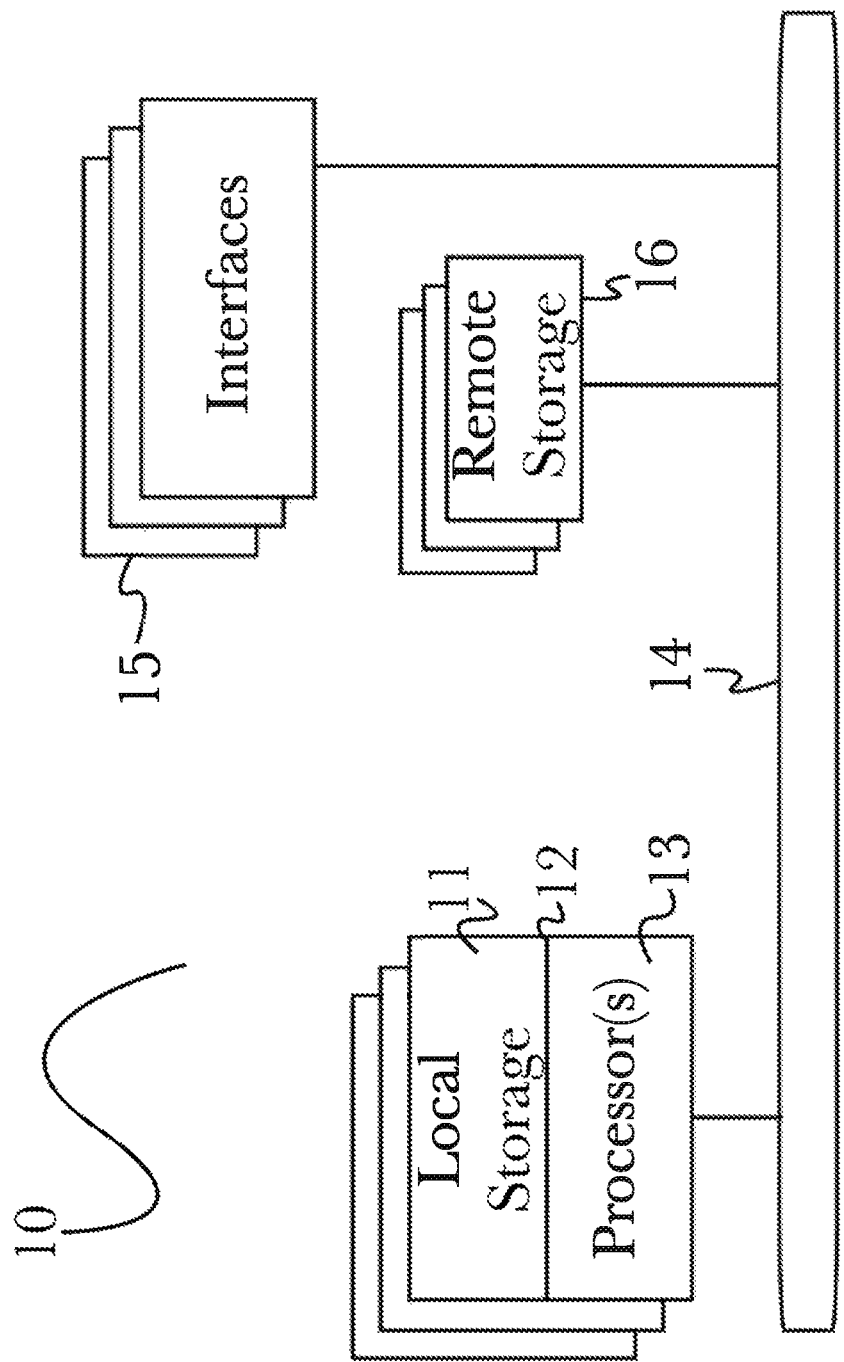
FIG. 9 is a block diagram illustrating an exemplary hardware architecture of a computing device.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
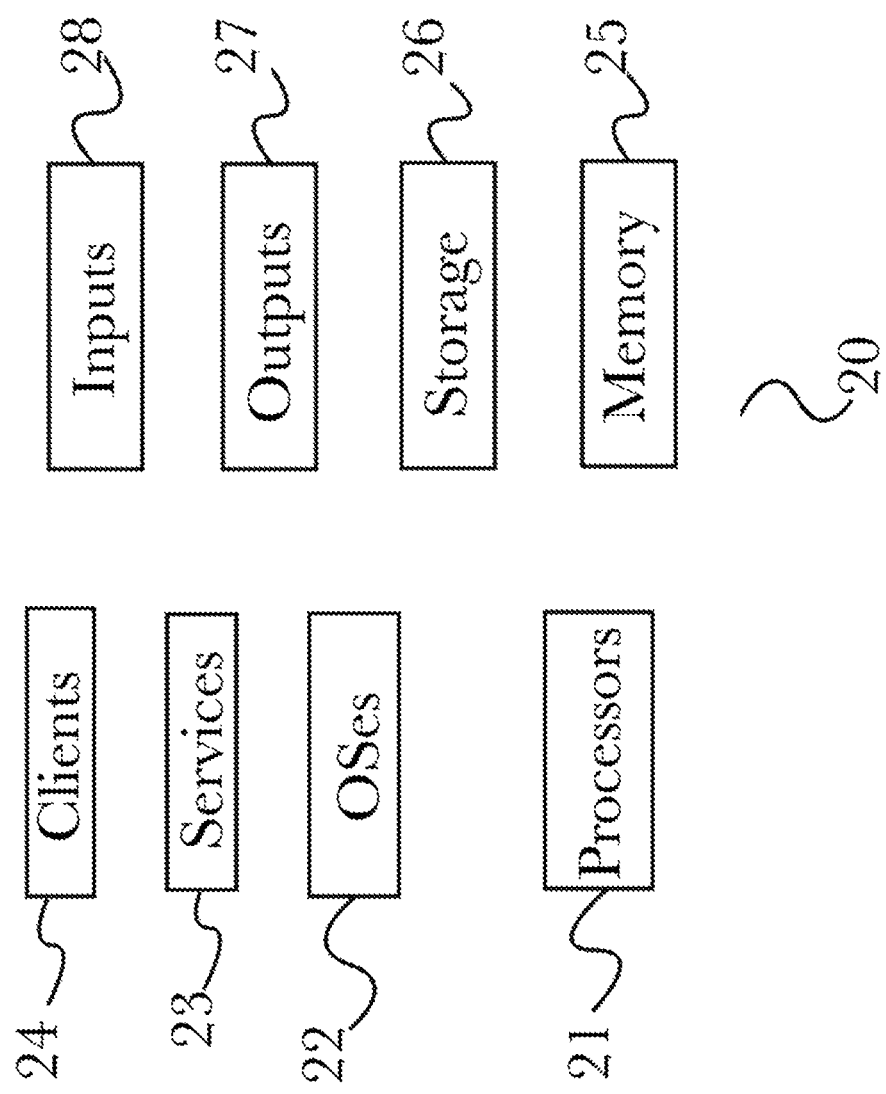
FIG. 10 is a block diagram illustrating an exemplary logical architecture for a client device.

In some embodiments, systems according to the present invention may be implemented on a standalone computing system. Referring now to FIG. 10, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
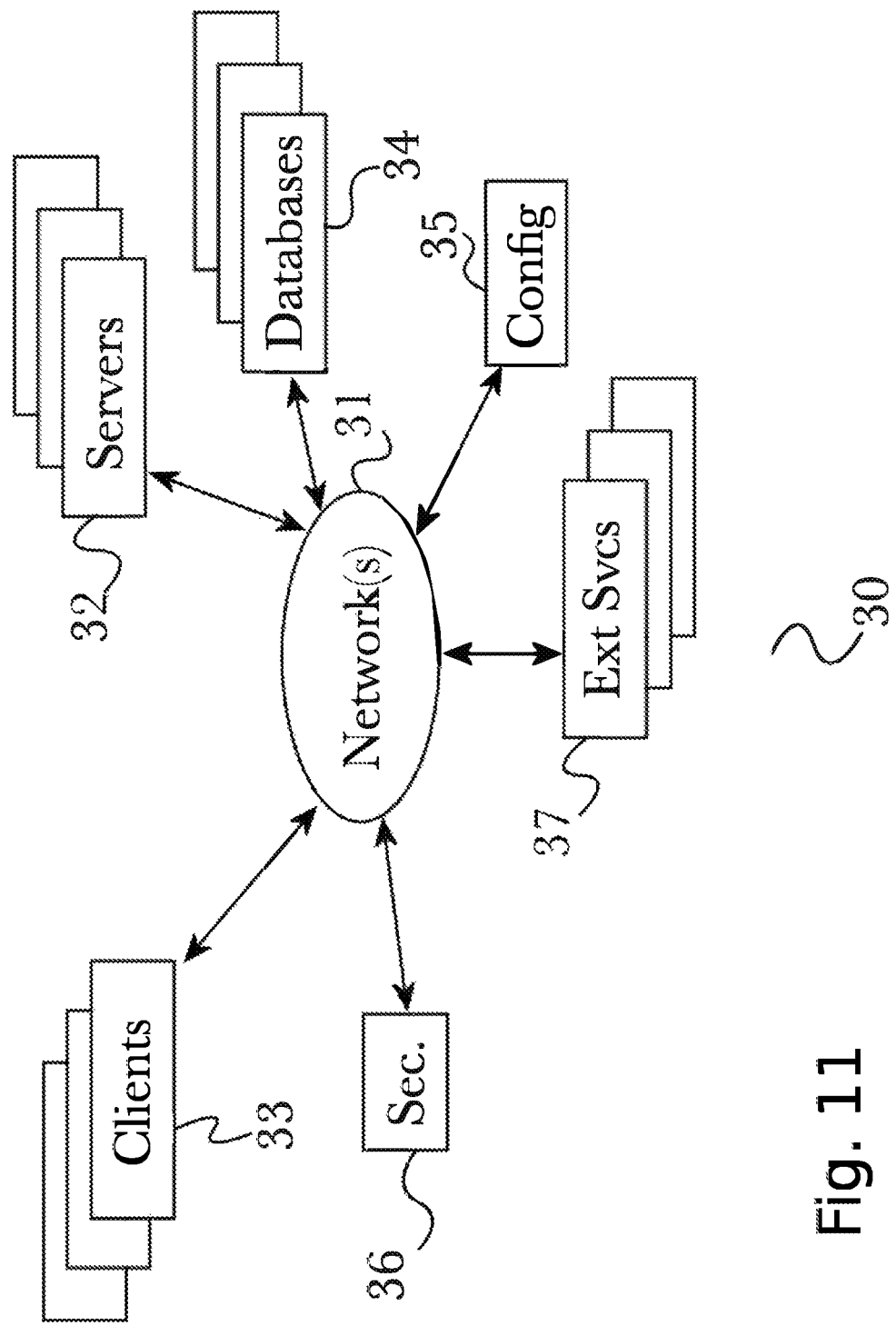
FIG. 11 is a block diagram showing an exemplary architectural arrangement of clients, servers, and external services.

In some embodiments, systems of the present invention may be implemented on a distributed computing network, such as one having any number of clients and/or servers. Referring now to FIG. 11, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 12:
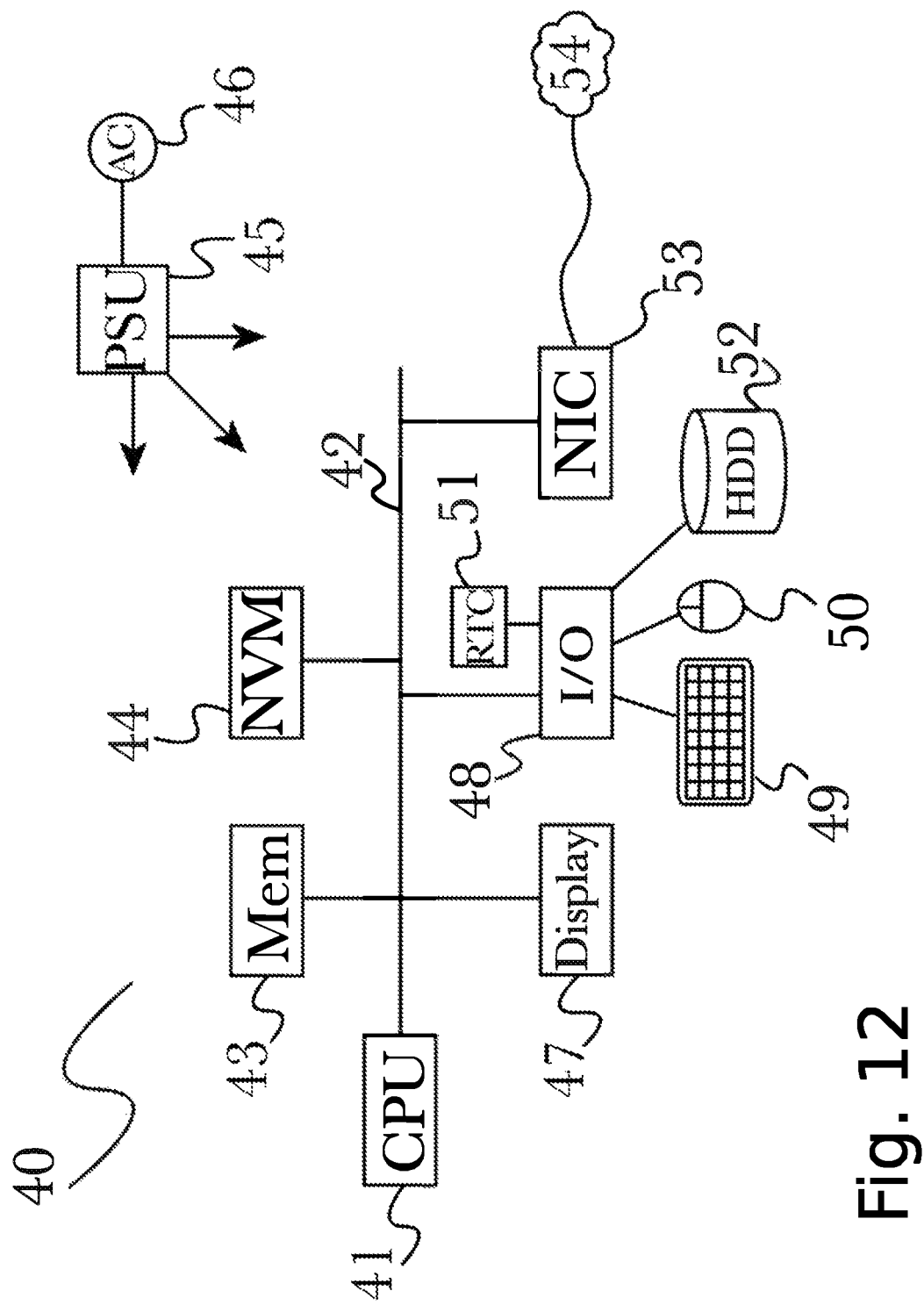
FIG. 12 is another block diagram illustrating an exemplary hardware architecture of a computing device.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for sandboxed software analysis with automated vulnerability detection, comprising:
 a computing device comprising a memory and a processor;
 a business operating system comprising a first plurality of programming instructions stored in the memory of, and operating on the processor of, the computing device, wherein the first plurality of programming instructions, when operating on the processor, cause the computing device to:
  receive a file comprising executable machine code;
  identify a type of device on which the executable machine code will operate;
  transfer the executable machine code to a sandbox environment, the sandbox environment comprising a controlled environment that emulates functionality of the identified type of device;
  receive an identified vulnerability from the sandbox environment; and
  change an operational behavior of a real device of the identified type of device to prevent exploitation of the identified vulnerability through either address space layout randomization or data execution prevention;
 wherein the sandbox environment comprises a second plurality of programming instructions stored in the memory of, and operating on the processor of, the computing device, wherein the second plurality of programming instructions, when operating on the processor, cause the computing device to:
  receive the executable machine code from the business operating system;
  create a first emulated environment configured to represent the identified type of device;
  execute the executable machine code within the first emulated environment;
  identify an irregularity in the execution of the executable machine code, the irregularity comprising two or more of the following activities performed in suspicious ways not normally performed by benign software: memory scanning, deletion of the file containing the executable machine code from storage media, access of system files, access of permissions, access of security settings, and access of network adapters;
  identify a vulnerability of the identified type of device being targeted by the identified irregularity in the execution of the executable machine code; and
  send the identified vulnerability to the business operating system.

2. The system of claim 1, wherein the sandbox environment is further configured to:
 create a second emulated environment configured to represent a second type of device;
 execute the executable machine code within the second emulated environment;
 compare the execution of the executable machine code within the first and second emulated environments; and
 identify an irregularity in the execution of the executable machine code in either the first or second emulated environment, the irregularity being identified based on the results of the comparison.

3. A method for sandboxed software analysis with automated vulnerability detection, comprising the steps of:
 receiving, at a business operating system, a file comprising executable machine code;
 identifying a type of device on which the executable machine code will operate;
 transferring the executable machine code to a sandbox environment, the sandbox environment comprising a controlled environment that emulates functionality of the identified type of device;
 receiving an identified vulnerability from the sandbox environment; and
 changing an operational behavior of a real device of the identified type of device to prevent exploitation of the identified vulnerability through either address space layout randomization or data execution prevention;
 wherein the sandbox environment performs the steps of:
  receiving the executable machine code from the business operating system;
  creating a first emulated environment configured to represent the identified type of device;
  executing the executable machine code within the first emulated environment;
  identifying an irregularity in the execution of the executable machine code, the irregularity comprising two or more of the following activities performed in suspicious ways not normally performed by benign software: memory scanning, deletion of the file containing the executable machine code from storage media, access of system files, access of permissions, access of security settings, and access of network adapters;

identifying a vulnerability of the identified type of device being targeted by the identified irregularity in the execution of the executable machine code; and sending the identified vulnerability to the business operating system.

4. The method of claim 3, further comprising the steps of:

creating a second emulated environment configured to represent a second type of device;

executing the executable machine code within the second emulated environment;

comparing the execution of the executable machine code within the first and second emulated environments; and identifying an irregularity in the execution of the executable machine code in either the first or second emulated environment, the irregularity being identified based on the results of the comparison.

\* \* \* \* \*